US011525361B2

(12) United States Patent
Hohenstein

(10) Patent No.: US 11,525,361 B2
(45) Date of Patent: Dec. 13, 2022

(54) WALL OF A HOT GAS COMPONENT AND HOT GAS COMPONENT COMPRISING A WALL

(71) Applicant: Siemens Energy Global GmbH & Co. KG, Munich (DE)

(72) Inventor: Sebastian Hohenstein, Dusseldorf (DE)

(73) Assignee: SIEMENS ENERGY GLOBAL GMBH & CO. KG, Munich (DE)

(*) Notice: Subject to any disclaimer, the term of this patent is extended or adjusted under 35 U.S.C. 154(b) by 0 days.

(21) Appl. No.: 16/640,900

(22) PCT Filed: Aug. 28, 2018

(86) PCT No.: PCT/EP2018/073090
§ 371 (c)(1),
(2) Date: Feb. 21, 2020

(87) PCT Pub. No.: WO2019/042970
PCT Pub. Date: Mar. 7, 2019

(65) Prior Publication Data
US 2020/0190990 A1 Jun. 18, 2020

(30) Foreign Application Priority Data
Aug. 30, 2017 (EP) .................................... 17188510

(51) Int. Cl.
*F01D 5/18* (2006.01)
*F01D 9/06* (2006.01)
*F01D 9/04* (2006.01)

(52) U.S. Cl.
CPC ............. *F01D 5/186* (2013.01); *F01D 9/065* (2013.01); *F01D 9/041* (2013.01);
(Continued)

(58) Field of Classification Search
CPC . F01D 5/18; F01D 5/186; F01D 25/08; F01D 25/12; F01D 9/041; F01D 9/065;
(Continued)

(56) References Cited

U.S. PATENT DOCUMENTS 6,183,199 B1 * 2/2001 Beeck ..................... F01D 5/186
416/97 R
7,997,867 B1    8/2011 Shih et al.
(Continued)

FOREIGN PATENT DOCUMENTS

CA         2802153 A1   2/2012
CA         2912828 A1   11/2014
(Continued)

OTHER PUBLICATIONS

PCT International Search Report and Written Opinion of International Searching Authority dated Dec. 17, 2018 corresponding to PCT International Application No. PCT/EP2018/07390 filed Aug. 28, 2018.

*Primary Examiner* — Eldon T Brockman
*Assistant Examiner* — Elton K Wong

(57) ABSTRACT

A wall of a hot gas component includes a hot and a cold-gas sided surface, one film cooling hole extending from an inlet in the cold-gas sided surface to an outlet in the hot-gas sided surface and with a metering section of constant cross-section and a diffuser section extending from the metering section. The diffuser section is bordered by a diffuser bottom and two opposing diffuser side walls, has a leading region, which extends from the metering section to the outlet, lies opposite the diffuser bottom and has a constant cross-section over its entire length corresponding to an elongation of a leading region of the metering section up to the outlet. The diffuser
(Continued)

section has two diffuser arms dividing the flow into two subflows, generating delta-vortices, a v-shaped outlet, and a v-shaped outlet opening.

17 Claims, 7 Drawing Sheets

(52) U.S. Cl.
CPC .... *F05D 2220/323* (2013.01); *F05D 2240/12* (2013.01); *F05D 2240/81* (2013.01); *F05D 2250/324* (2013.01); *F05D 2260/202* (2013.01)

(58) Field of Classification Search
CPC ..... F05D 2260/202; F05D 2260/22141; F05D 2240/12; F05D 2240/81; F05D 2250/324; F23R 3/002; F23R 3/06; F23R 2900/03042
See application file for complete search history.

(56) References Cited

U.S. PATENT DOCUMENTS

| | | | |
|---|---|---|---|
| 8,057,181 B1 | 11/2011 | Liang | |
| 8,905,713 B2 | 12/2014 | Bunker et al. | |
| 9,181,819 B2 | 11/2015 | Lee et al. | |
| 2011/0097191 A1 | 4/2011 | Bunker | |
| 2013/0205787 A1* | 8/2013 | Zelesky | F23R 3/06 60/722 |
| 2013/0206739 A1* | 8/2013 | Reed | B23K 26/389 219/121.71 |
| 2014/0219815 A1* | 8/2014 | Kohli | F23R 3/06 416/97 R |
| 2015/0159871 A1* | 6/2015 | Pearson | F23R 3/04 60/754 |
| 2016/0186576 A1* | 6/2016 | Thornton | F01D 9/041 415/115 |
| 2018/0135520 A1* | 5/2018 | Lewis | F01D 9/023 |

FOREIGN PATENT DOCUMENTS

| | | |
|---|---|---|
| CN | 102140964 A | 8/2011 |
| CN | 102261281 A | 11/2011 |
| EP | 0945593 A1 | 9/1999 |
| EP | 1609949 A1 | 12/2005 |
| EP | 1788193 A2 | 5/2007 |
| EP | 1873353 A2 | 1/2008 |
| EP | 2554792 A1 | 2/2013 |
| JP | S62228328 A | 10/1987 |
| JP | H1089005 A | 4/1998 |
| WO | 2012021194 A2 | 2/2012 |

* cited by examiner

WALL OF A HOT GAS COMPONENT AND HOT GAS COMPONENT COMPRISING A WALL

CROSS REFERENCE TO RELATED APPLICATIONS

This application is the US National Stage of International Application No. PCT/EP2018/073090 filed 28 Aug. 2018, and claims the benefit thereof. The International Application claims the benefit of European Application No. EP17188510 filed 30 Aug. 2017. All of the applications are incorporated by reference herein in their entirety.

FIELD OF INVENTION

The invention relates to a wall of a hot gas component comprising at least one film cooling hole and a hot gas component comprising such a wall.

BACKGROUND OF INVENTION

Components in a hot gas path, like turbine blades and/or vanes for example, are subject to high thermal loads. In this context the problem can arise that the temperature of the working fluid exceeds the maximal acceptable temperature of the components' material. Therefore, extensive cooling is needed to keep the material temperature within an acceptable limit and thus to protect the components from overheating.

Turbine components for example are usually cooled using thermal (convective) cooling in combination with thermal barrier coatings. In particular in the front stages, where the working fluid's temperature is very high, additional film cooling is applied. By doing so an isolating layer of a cooling fluid, for example comparably cool air, is applied to the turbine components' surfaces preventing a direct contact of hot working fluid with the turbine components. The isolating layer of cooling fluid is usually applied by using discreet film cooling holes which are drilled through a wall of the component.

The film cooling holes are usually inclined such with respect to the hot-gas sided surface that cooling fluid will be ejected in a direction which has a component that is parallel to the main gas stream passing over the hot-gas sided surface.

The film cooling holes can furthermore generally be separated in two classes. They can either have a constant for example circular cross section over their entire longitudinal extension through a component's wall, i.e. from an inlet in the cold-gas sided surface to the outlet on the opposing hot-gas sided surface. Alternatively, film cooling holes can be shaped, wherein a shaped film cooling hole usually comprises two sections, namely a metering section that starts at the inlet and has a constant cross-sectional area in the longitudinal direction and a subsequent diffuser section which usually diverges towards the outlet on the opposing side and has planar side walls. Due to its expansion, a diffuser section shall enable a broader coverage of the hot-gas sided surface with the ejected cooling fluid. The diffuser also reduces the risk of flow separation at higher blowing ratios. Furthermore, the cooling fluid jet does not penetrate too far into the main beam. Different diffuser shapes are known from the state of the art.

Walls with shaped film cooling holes with a metering and a diffuser section are for example disclosed in EP 0 945 593 A1, EP 1 609 949 A1, CA 2 912 828 A1 and WO 2012/021194 A3.

Furthermore, CA 2 912 828 A1 and also EP 2 554 792 A1 each discloses a wall with film cooling holes that are specifically shaped such as to avoid that the cooling fluid is separated from the wall surface. This shall enhance the film efficiency on the wall. The film cooling holes according to this document comprise a cylindrical main passage, a pair of cylindrical branch passages branching off from a point on the main passage and two communication passages that allow the main passage to communicate with the branch passages. Due to this configuration, the cooling medium components injected from the branch passages are supposed to be separated by the cooling medium injected from the main passage and a pair of straight flows having high directivities shall be formed. A low-pressure portion having a sufficiently low pressure is supposed to be generated between the pair of straight flows with high directivities and flows which are inwardly swirled from areas surrounding the straight flows to the low-pressure portion and oriented toward the wall surface shall be generated. Due to this, a separation of the cooling fluid from the wall shall be avoided.

Also EP 1 873 353 discloses a film cooling whole with a bi-lobed shape of the outlet opening to improve the cooling effectiveness. The hole shape provides high coverage by flaring the hole to a large width (at the lobed portion) in the direction perpendicular to the streamwise flow by contracting the downstream side of the hole forward to optimize the diffusion within the hole, resulting in the bi-lobed shape.

Further U.S. Pat. No. 7,997,867 proposes to film cooling hole with a w-shaped diffusor bottom upstream of a straight diffusor trailing edge for preserving momentum of the coolant and preventing entrainment of the hot gases. Then U.S. Pat. No. 8,057,181 B1 discloses a film cooling hole with smooth surfaces and without sharp corners to eliminate the internal flow separation within the film cooling hole. A asymmetric chevron-like film cooling hole is proposed by US 2011/0097191 A1 for a variety of airfoil surfaces or airfoil regions, particularly in regions and applications where the surface fluid streamline curvature is significant.

Hence, film cooling holes are able to apply a cooling fluid to hot gas components' surfaces in order to build up an isolating layer and therefore to prevent hot gas to get in contact with the components' surface.

Nevertheless, the ejection of cooling fluid into the main stream of hot gas passing over the hot-gas sided surface of a component leads to a complex system of vortices which is schematically depicted in FIG. 10. In general, four different vortex structures can be identified therein, namely the so-called ring vortices $\Omega 1$, counter rotating vortex pair $\Omega 2$ (also named kidney vortices), horseshoe vortices $\Omega 3$ and instationary vortices $\Omega 4$. Theses vortices and the reasons for their formation are further explained in EP 2 990 606 A1 which is incorporated herein by reference.

Especially the counter rotating vortex pair $\Omega 2$, which is also called kidney vortex, and which results from the bending of the cooling fluid jet or streak and the resulting pressure gradient within the streak or jet, leads to a movement of cooling fluid away from the wall and towards the main gas stream. This significantly reduces the film cooling effectiveness, especially with increasing distance downstream of a film cooling hole.

From CN 102140964 A it is known to dispose on the hot-gas sided surface of a component wall a boomerang shaped bulge downstream from the outlet of a non-shaped, cylindrical film cooling hole. Due to the bulge cooling air is transversely extended, the rotation direction of a cooling air kidney-shaped vortex pair is changed and cooling air is adhered to the wall.

Although the solutions known from the state of the art allow enhancing the film cooling effectivity, alternative, further improved solutions are still needed.

SUMMARY OF INVENTION

It is therefore an object of the present invention to provide a film cooling hole having increased film cooling capabilities.

The object of the invention is achieved by the independent claim. The dependent claims describe advantageous developments and modifications of the invention. Their features could be combined arbitrarily.

The main idea of the present invention is to provide a wall with at least one film cooling hole with a geometry that is especially designed to generate vortices counter acting with the vortices resulting from the injection of a film cooling fluid, in particular the counter rotating vortex pair Ω2.

Within each arm of the diffuser section a vortex will be generated when cooling fluid flows through an inventive film cooling hole. These vortices form a vortex pair which has a direction of rotation that is opposite to the counter rotating vortex pair Ω2 induced by the pressure gradient within the cooling fluid streak and therefore will be called anti-counter rotating vortex pair hereinafter.

The new design furthermore makes use of a delta vortex generator in order to increase both, the strength as well as the spatial extension of the anti-counter rotating vortex pair generated within the two arms to further increase the film cooling effectiveness. The generated delta vortices have the same direction of rotation as the anti-counter rotating vortex pair.

Delta-vortices and the mechanisms for their formation are known from the state of the art. They are in particular generated when a fluid is divided by a delta- or wedge-shaped element. They are for example also generated at the delta-shaped wings of aircrafts.

The anti-counter rotating vortex pair and the delta vortex in combination reduce the strength of the vortex pair Ω2 and therefore reduce the wall normal mixing, i.e. the mixing of the cooling fluid with the main flow and efficiently increase the film cooling effectiveness.

A leading region of the diffuser section that extends from the metering section to the outlet in the hot-gas sided surface and lies opposite the diffuser bottom has a constant cross-section over its entire length, wherein the leading region of the diffuser section in particular corresponds to an elongation of a leading region of the metering section up to the outlet. Then the diffuser section (when seen in cross-section) does not diverge but is characterized by a constant cross-sectional area along its entire longitudinal extension. In particular, part of the metering section's cross-section continues—as part of the diffuser section—up to the outlet in the hot-gas sided surface.

The leading region of the diffuser section has the form of a cylinder segment, in particular the form of half-cylinder or less than half-cylinder. This will be the case when the metering section is of cylindrical form since the only segment-vise elongation of a cylindrical metering section will result in a leading region with a shape corresponding to that of a cylinder segment.

The diffuser bottom is arched such that a central edge that extends from the metering section or a point on the diffuser bottom near the metering section to the outlet in the hot-gas sided surface and two diffuser arms on both sides of the central edge that branch off from the metering section in a V-shaped manner are obtained as means for generating delta-vortices.

The central edge is blunt and/or at least substantially linear. The central edge in particular extends from the end of the metering section, advantageously from a point on the metering section's contour, to the outlet in the hot-gas sided surface. The central edge connects both arms of the diffuser section. The central edge in particular is centered with respect to the metering section and faces the metering section such that a flow of cooling fluid exiting the metering section will be evenly divided into two subflows by the central edge while generating delta-vortices.

The outlet in the hot-gas sided surface is substantially V-shaped, in particular substantially boomerang-shaped. In this case each arm of the V or boomerang is in particular defined by one of the two diffuser arms. The outlet in the hot-gas sided surface particularly has a trailing edge that is at least substantially V-shaped. A boomerang shaped outlet with a corresponding trailing edge has proven to be especially suited for generating delta vortices. As regards the two diffuser arms that branch off from the metering section in a V-like manner and that are separated by the central edge, the angle included by them lies in the range of 50° to 80°, advantageously in the range of 56° to 76° to achieve the generation of the delta-vortices with highest impact. The angle advantageously is defined by the angle included by the two central longitudinal axes of the arms as seen in a plane that is orthogonal to the central longitudinal axis of the metering section.

The at least substantially V-shaped trailing edge of the outlet defines an angle in the range of a 100° to 60°, advantageously 100° to 70°, particularly advantageously 95° to 70°. Angles in these ranges are required for the generation of the delta-vortices. In case that the two arms of the V-shaped trailing edge are not linear, but for example curved, the angle is in particular defined by tangents to the two arms of the trailing edge. If the two arms of the trailing edge are linear over only part of their longitudinal extension, the angle can also be defined by a linear section of the two arms. An angle in the given ranges is in particular defined by the trailing edge seen in the plane of the hot-gas sided surface.

The diffuser section has two curved, in particular convex side walls. In particular each curved side wall of the diffuser section is an outer side wall of one of the diffuser arms. The radius of curvature of the respective side wall advantageously varies in longitudinal direction of the respective arm.

The diffuser bottom is arched such that—together with part of the hot-gas sided surface—a substantially triangular—or delta shaped wedge that points in the direction of the metering section is obtained which—in the plane of the hot-gas sided surface—defines an at least substantially V-shaped trailing edge of the outlet. A bottom arched like this is especially suited for the efficient generation of delta vortices.

It is noted that the expressions leading and trailing are used herein—as is common—in relation to the direction of a main stream of a hot gas flowing over the hot-gas sided surface during operation of for example a gas turbine comprising a component with the inventive wall. The leading edge will be oriented such that the main stream reaches it first and the trailing edge afterwards. Independent from the direction of a main gas stream during operation, the leading and trailing edge are lying opposite each other.

The diffuser arms can each be of curved cross-sectional shape, in particular be shaped like a trough. A curved geometry further facilitates the formation of a vortex in each arm with a rotation direction opposite that of the counter rotating vortex pair Ω2 and by that further enhance the film cooling effectivity.

The length of the diffuser arms advantageously exceeds the length of the central edge. Then an at least substantially V-shaped trailing edge can be defined between the two sections of the arms that extend further than the central edge.

Alternatively or in addition the diffuser arms are inclined relative to the metering section. The metering section as well as the diffuser arms are furthermore advantageously inclined relative to the hot-gas sided surface of the wall, wherein the angle between the arms and the hot-gas surface advantageously is smaller than the angle between the metering section and the hot-gas surface. The angle between the metering section and the hot-gas sided surface can for example be in the range of 20° to 45°, in particular 30° to 40°. The angle between the diffuser arms and the hot-gas sided surface can for example be in the range of 5° to 25°, in particular 10° to 15°.

Furthermore, the metering section can for example have a circular cross-section. A metering section with such a shape can be conveniently manufactured for example by laser hole drilling or the like. The metering section can alternatively have an elliptical cross-section.

The diffuser section furthermore advantageously has such a geometry that—in particular seen along a central longitudinal axis of the metering section—there are no undercuts which further facilitates easy manufacturing.

The metering section and the leading region of the diffuser section advantageously have the same radius.

A leading region with constant cross-sectional area allows for particularly easy manufacturing since in a first step a hole, in particular a cylindrical hole that extends all the way from the cold-gas side to the hot-gas side of the wall can easily be drilled and in a second step the remaining part of the diffuser, including the central edge and the two arms, can easily be joined to the advantageously cylindrical hole. Since the leading region does not contribute to the vortex system, it can be kept in the form of the metering section.

In addition to an outer side wall, each defining one side of the diffuser section, each arm advantageously has a further, inner side wall opposite the outer one. Then the two inner side walls of the arms advantageously define a wedge-shaped arched part of the diffuser bottom. The inner side walls of the two arms in particular have the central edge as a common edge facing the metering section. The inner side walls of the two arms can—like the outer side walls—be curved, for example convex.

Advantageously the diffuser section has curved, in particular convex side walls that connect the bottom with the leading region of the diffuser section. If the side walls of the diffuser are curved, in particular convex, they can have a larger radius than the advantageously cylinder-segment shaped leading region of the diffuser section. This—on one hand—facilitates an easy manufacturing as described above, and—on the other hand—facilitates the generation of a vortex in each arm.

According to another embodiment, the ratio AR of a cross-sectional area A2 of the diffuser section that intersects a leading point of the outlet in the hot-gas sided surface to the cross-sectional area A1 of the metering section is in the range of 2 to 6, in particular 3, 5 to 4, 0.

The diffuser section's cross sectional area ratio AR=A2/A1 significantly affects the tendency of a flow to separate. While a large ratio AR is beneficial for a strong deceleration of the flow it also leads to flow separation.

The metering section will usually have a central longitudinal axis which lies in one plane with the central edge. In this plane the angle between the central edge and the central longitudinal axis of the metering section advantageously is in the range of 7° to 15°.

The leading point of the outlet—in relation to which the area A2 named above is defined—then advantageously lies in the same plane the central longitudinal axis of the metering section and the central edge are lying in and opposite the central edge.

Advantageously the shape of the diffuser section is such that—seen along the central longitudinal axis of a advantageously cylindrical metering section—there are no undercuts so that the inventive film cooling hole can easily be manufactured.

The present invention furthermore provides a hot gas component, in particular a component for a gas turbine, comprising at least one, advantageously a number of the inventive film cooling holes described above.

If there is a number of film cooling holes provided in a wall according to the present invention, the film cooling holes are advantageously arranged in one or multiple rows of such film cooling holes.

A hot gas component according to the present invention could for example be designed a turbine plate of a rotor, a stationary turbine vane a stationary turbine nozzle and/or ring segments of a gas turbine or a combustor shell all the like. Further parts, in particular of gas turbines, could also comprise the inventive wall with at least one film cooling hole as described above. Any kind of component requiring film cooling can comprise a wall with at least one film cooling hole according to the present invention.

BRIEF DESCRIPTION OF THE DRAWINGS

Embodiments of the invention are now described, by way of example only, with reference to the accompanying drawings, of which.

DETAILED DESCRIPTION OF INVENTION

Figure 1:
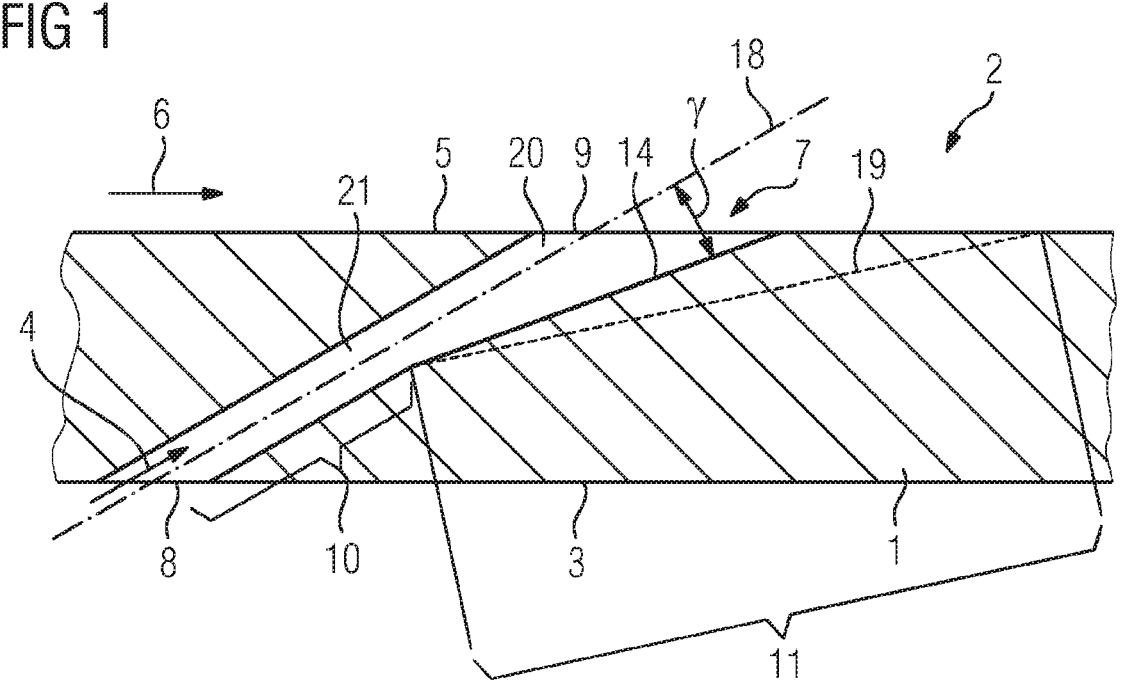
FIG. 1 shows a cross section through a wall comprising a film cooling hole according to the invention as a first exemplary embodiment.

The illustration in the drawings is in purely schematic form. It is noted that in different figures similar or identical elements are provided with identical reference signs.

FIG. 1 shows a cross section through a wall 1 of a hot gas component designated to be assembled and used in a gas turbine that is not shown in the figures. The wall 1 comprises a first, cold-gas sided surface 3 subjectable to a cooling fluid 4. Opposing the cold-gas sided surface 3 the wall 1 comprises a second, hot-gas sided surface 5 that is dedicated to be subjectable to a hot gas 6.

In the wall 1 multiple film cooling holes 7 (compare FIGS. 11 to 13) are located from which only one is shown in FIG. 1. FIGS. 2 to 5 show different perspective views—each again of only one of film cooling holes 7—wherein only the film cooling hole's 7 contour is shown but not the wall 1 through which the film cooling hole 7 extends.

As can be seen in the figures, each film cooling hole 7 extends from an inlet 8 in the cold-gas sided surface 3 to an outlet 9 in the hot-gas sided surface 5 of the wall 1 for leading cooling fluid 4 from the cold-gas sided surface 3 to the hot-gas sided surface 5.

Figure 10:
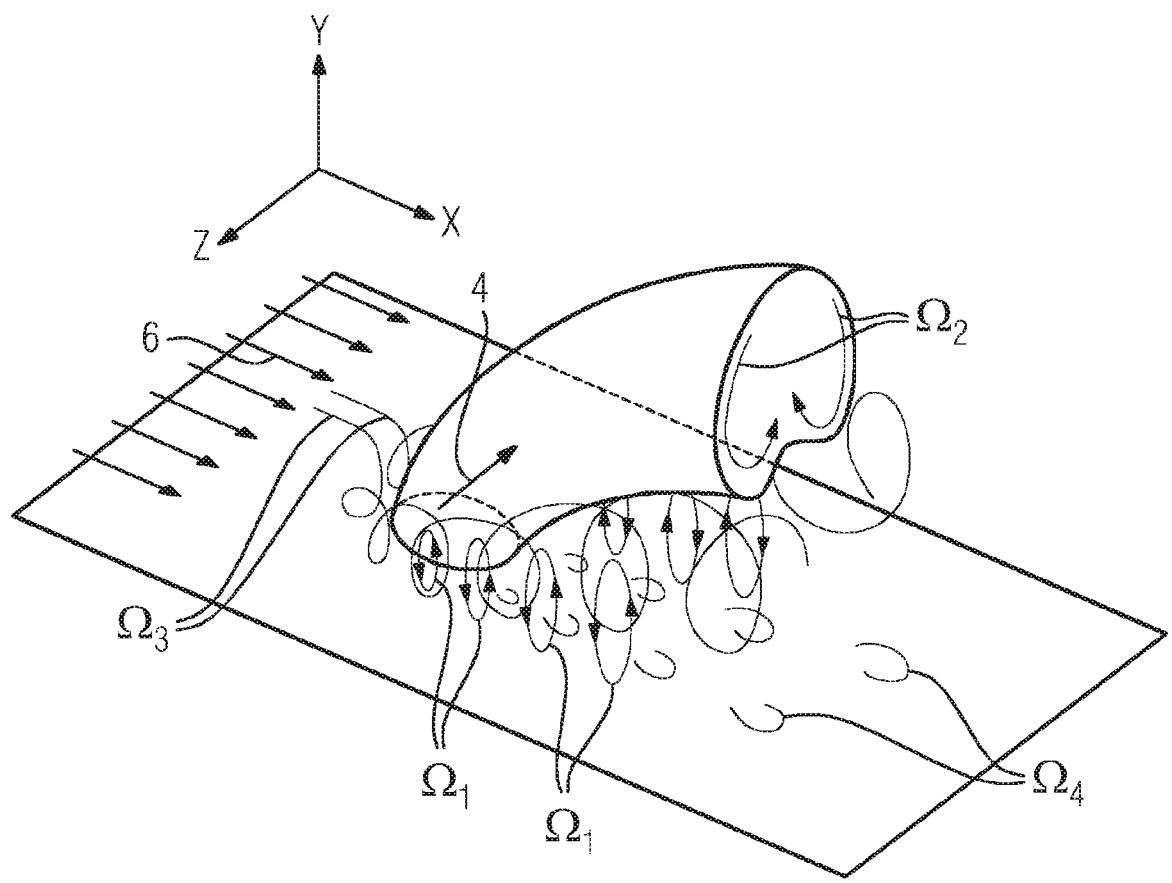

The film cooling holes 7 are according to the present invention especially designed to generate vortices counter acting with the vortices resulting from the injection of film cooling fluid 4, in particular the counter rotating vortex pair $\Omega2$ (regarding the vortices resulting from injection compare FIG. 10 and the corresponding description above).

Each film cooling hole 7 comprises a metering section 10 that extends downstream from the inlet 8 (with respect to the flow direction of the cooling fluid 4 through the film cooling hole 7) and which has a constant cross-sectional area in the longitudinal direction of the film cooling hole 7. Within the framework of the exemplary embodiment described herein, the metering section 10 has a circular cross section.

Each film cooling hole furthermore comprises a diffuser section 11 extending from the metering section 10 to the outlet 9 in the hot-gas sided surface 5. The diffuser section 11 is at least bordered by a diffuser bottom 12 and two opposing diffuser sidewalls 13. The diffuser bottom 12 is that part of the internal surface of the film cooling hole 7 that is lying opposite the cold-gas sided surface 3. The diffuser bottom 12 mergers laterally into each diffuser' sidewall 13 via rounded edges. The diffuser bottom 12 is in particular visible in FIGS. 2, 3 and 5 and the diffuser sidewalls 13 are in particular visible in FIGS. 2, 3 and 4.

Figure 2:
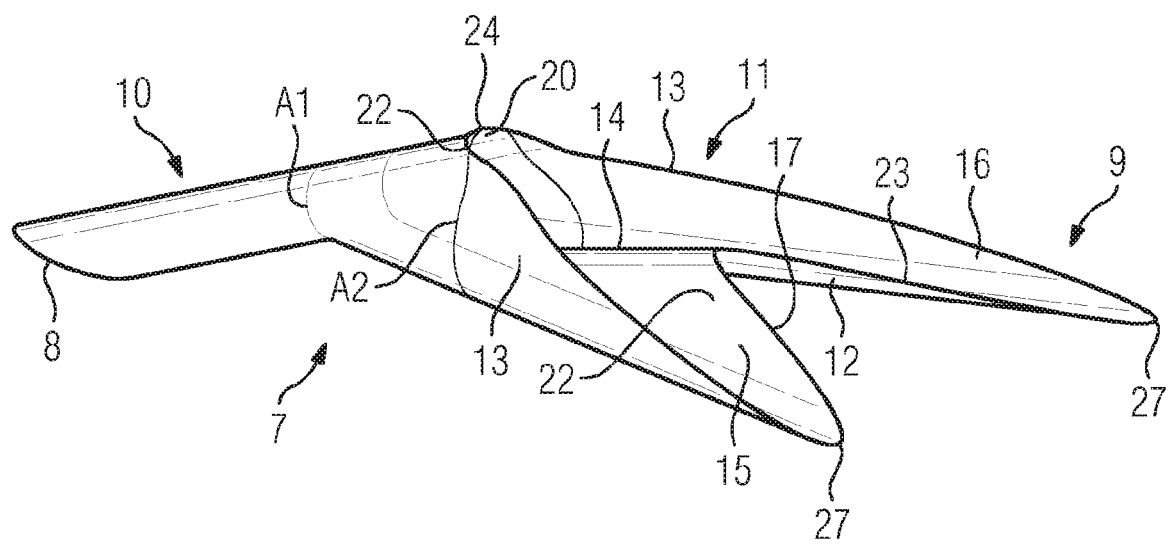
FIG. 2 shows the film cooling hole according to FIG. 1 in a perspective view seen from obliquely above.

As can be seen in particular in FIG. 2, the diffuser bottom 12 of the inventive film cooling hole 7 is arched such that a linear blunt central edge 14 extending from the end of the metering section 10 to the outlet 9 in the hot-gas sided surface 5, and two diffuser arms 15, 16 on both sides of the central edge 14 that branch off from the metering section 10 in V-shaped manner (FIGS. 3 and 5) are obtained. Within the framework of the described embodiment the central edge 14 is slightly rounded, i.e. blunt which facilitates easy manufacturing but it can also be a sharp edge. The arms 15, 16 slope to both sides of the central edge 14 in a direction away from the metering section 10. As can be seen in the figures, the diffuser bottom 12 is in detail arched such that a wedge-shaped element in the diffuser section 11 with the central edge 14 as a leading edge is obtained. The central edge 14 evenly divides cooling fluid 4 flowing in from the metering section 10 and two sub-flows, one flowing through each arm 15, 16, will be generated.

Figure 3:
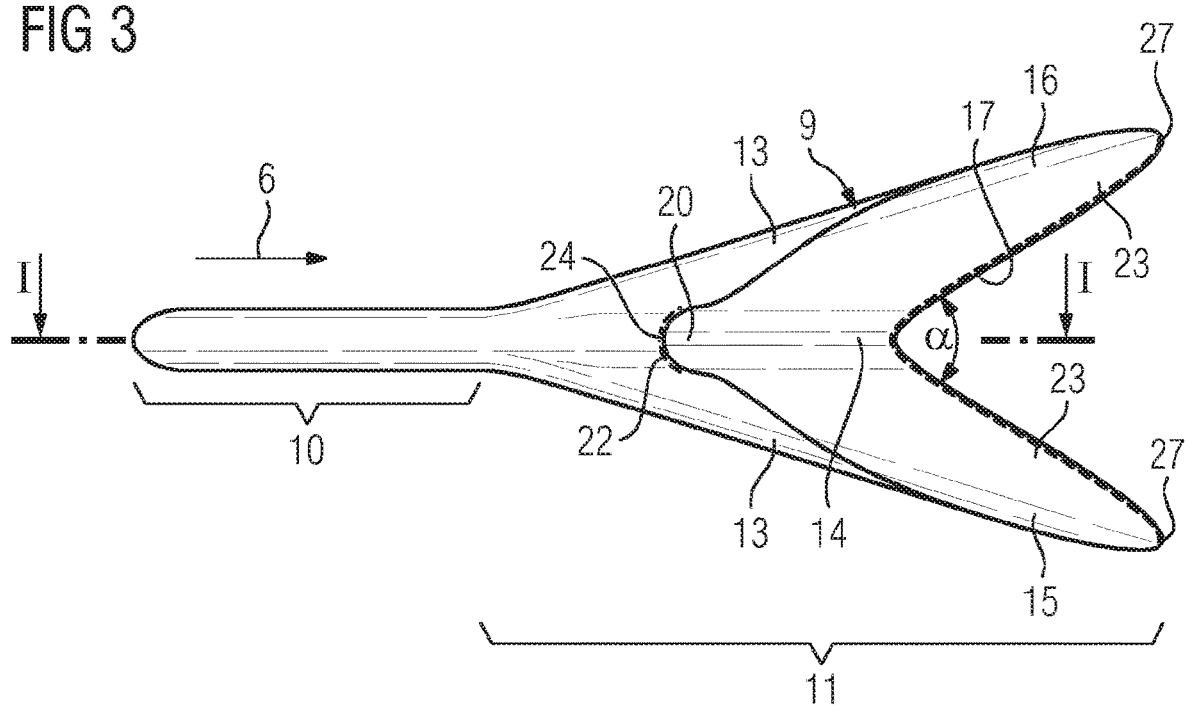
FIG. 3 shows a perspective top view of the film cooling hole according to FIG. 1.
Figure 4:
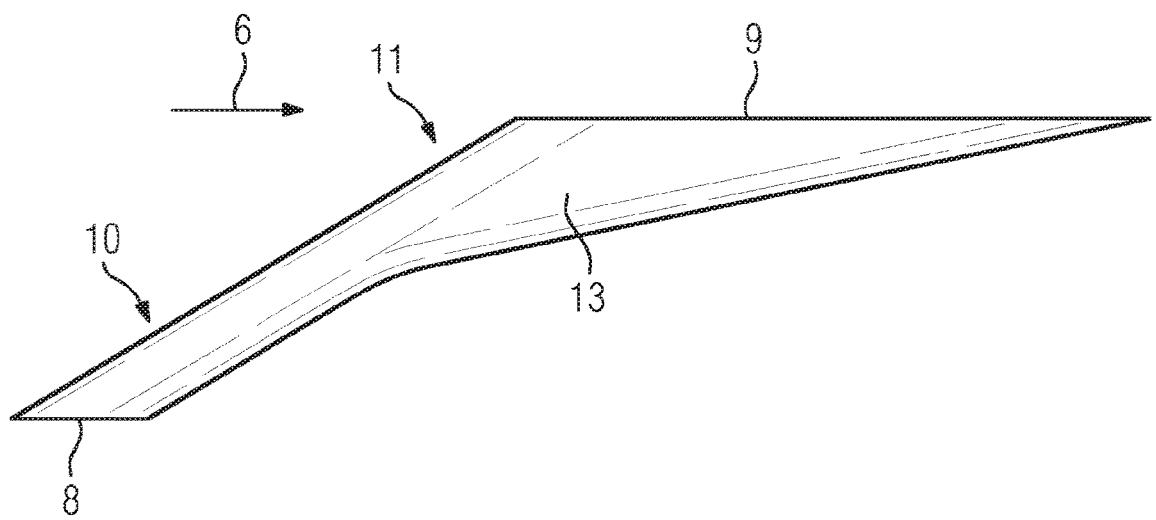
FIG. 4 shows a perspective side view of the film cooling hole according to FIG. 1.
Figure 5:
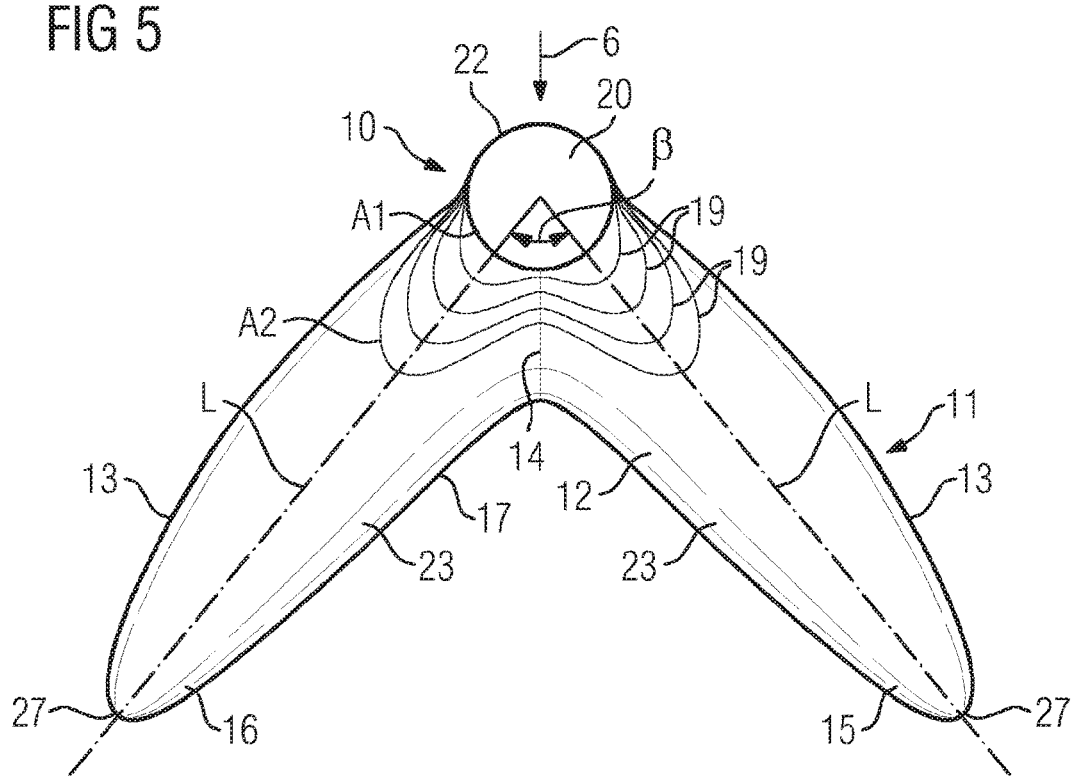
FIG. 5 shows a perspective bottom view of the diffuser section of the film cooling hole according to FIG. 1 seen along the central longitudinal axis of the metering section, FIG. 6 the outlet of the film cooling hole according to FIG. 1 with a purely schematic depiction of the anti-counter rotating vortex pair and delta vortices, FIG. 7 a cross section through the diffuser section of the film cooling hole according to FIG. 1 and a purely schematic depiction of the flow in the arms and above the hot-gas sided surface, FIG. 8 a cross section at the end of the diffuser section of the film cooling hole according to FIG. 1 and a purely schematic depiction of the flow above the hot-gas sided surface, FIG. 9 a cross section at a defined distance behind the diffuser section of the film cooling hole according to FIG. 1 and a purely schematic depiction of the flow above the hot-gas sided surface, FIG. 10 a purely schematic representation showing the generation of vortices of cylindrical film cooling hole.
Figure 6:
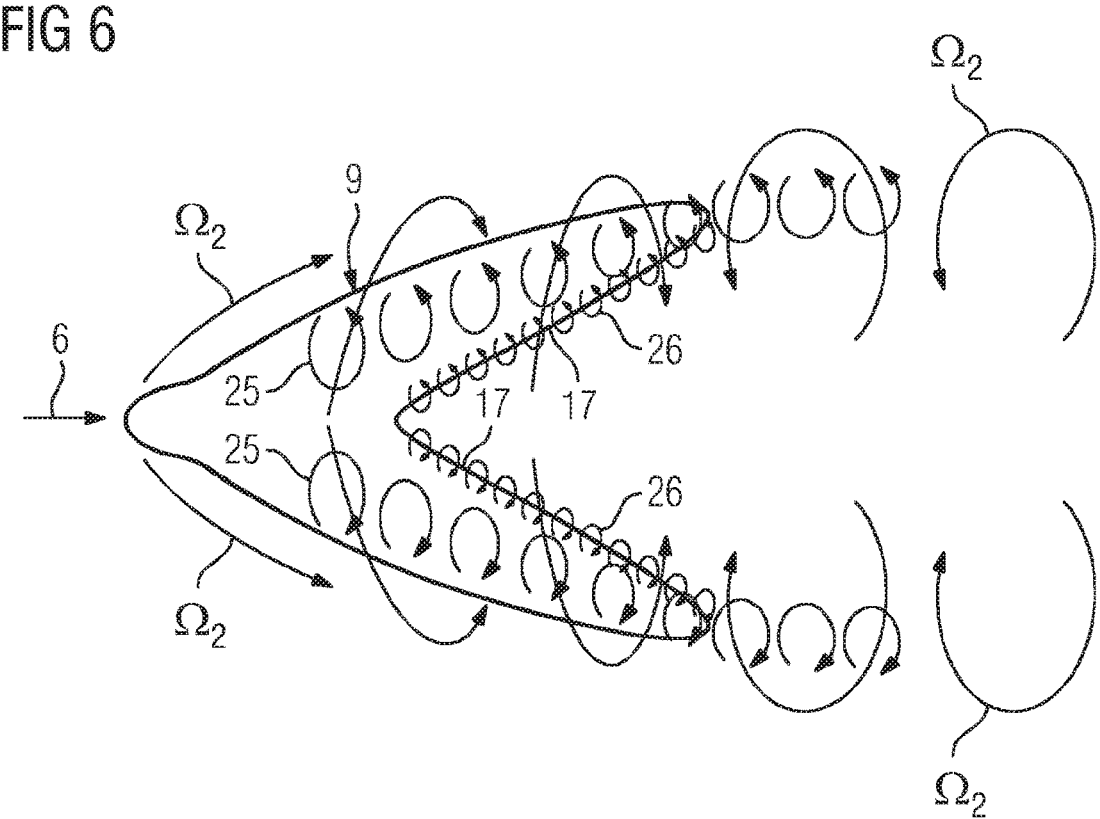

As can be seen in particular in FIGS. 3, 5 and 6 an outlet 9 in the hot-gas sided surface 5 is obtained that is substantially boomerang-shaped and has a substantially V-shaped trailing edge 17 (compare again in particular FIGS. 3 and 5). It is noted that the expressions leading and trailing are herein used—as is common—in relation to the direction of the main stream of hot gas 6 flowing over the hot-gas sided surface 5 during operation (compare the corresponding arrow in the figures marked with reference sign 6).

Regarding the described exemplary embodiment, the substantially V-shaped trailing edge 17 includes—in the plane of the hot-gas sided surface 5—an angle $\alpha$ of about 80° (compare FIG. 3) and functions as a delta vortex generator as further described below. It is furthermore—compared to the blunt central edge 14—comparably sharp.

As regards the two diffuser arms 15, 16, they include—seen in a plane that is orthogonal to the central longitudinal axis 18 of the metering section 10—an angle $\beta$ between their longitudinal axes L that extend from the center of the metering section 10 to the tip of the respective arm of about 70°.

Furthermore, the angle $\gamma$ that is—in the cross section according to FIG. 1—included by the central longitudinal axis 18 of the metering section 10 and the central edge 14 is about 7°.

As can be seen for example in the cross section through the wall 1 according to FIG. 1, where the projection of the bottom edge 19 of the two diffuser arms 15, 16 in this plane is indicated by a dashed line, the length of the diffuser arms 15, 16 exceeds the length of the central edge 14.

Each of the diffuser arms 15, 16 is of curved cross-sectional shape as can best be seen in FIG. 5 which shows a view of the diffuser section from below along the central longitudinal axis 18 of the cylindrical metering section 10 and wherein section lines 19 at different depths in the diffuser section 11 are indicated. The curved cross-sectional shape of the arms 15, 16 facilitates the formation of vortices in each arm 15, 16.

The diffuser section 11 of the described embodiment of inventive film cooling holes 7 furthermore is characterized in that a leading region 20 of the diffuser section 11 that extends from the metering section 10 to the outlet 9 in the hot-gas sided surface 5 and that lies opposite the diffuser bottom 12 and the central edge 14 thereof has a constant cross section over its entire length, i.e. from the end of the metering section to the outlet 9. The leading region 20 of the diffuser section 11 corresponds to an elongation of a leading region 21 of the metering section 10 up to the outlet 9. This can best be seen in FIGS. 2 and 3 which show that in the upper part of the film cooling hole 7 in these figures the cross-sectional area remains constant form the inlet 8 up to the outlet 9. The leading region 20 of the diffuser section 11 accordingly has the form of the cylinder segment and a circular leading edge 22 of the outlet 9 is obtained (in FIG. 3 the leading edge 22 is indicated with a dashed line).

This configuration makes the manufacturing of the inventive film cooling holes 7 especially easy since it enables the application of a two-step drilling process wherein first a cylindrical hole extending all the way from the cold 3 to the hot-gas sided surface 5 is drilled and subsequently the two arms 15, 16 are added to obtain the diffuser section 11. The manufacturing of the film cooling holes 7 can for example be achieved by laser hole drilling. Since the leading region 20 of the diffuser section 11 does not contribute to the vortex system, it can be kept in this shape to facilitate easy manufacturing.

The figures show that there are no undercuts in the diffuser section 11 which further facilitates easy manufacturing.

As mentioned above, the two arms 15, 16 of the diffuser section 11 are of curved cross-sectional shape. The two side walls 13 of the diffuser section 11 are convex. The radius of curvature of the side walls 13 varies in the direction of the longitudinal axis L extending from the center of the metering section 10 to the tip of the respective arm.

Each diffuser arm, 15, 16 also has an inner side wall 23, the side walls 23 being part of the arched diffuser bottom 12 and being—like the (outer) side walls 13—curved, although in the exemplary embodiment described herein the inner side walls 23 are—compared to the (outer) sidewalls 13—comparably flat.

The sidewalls 13 of the diffuser section 11 connect the diffuser bottom 12 with the leading region 20 wherein—as can best be seen in FIGS. 2 and 3—the sidewalls 13 have a lager radius than the leading region 20. This facilitates the forming of vortices in the diffuser arms 15, 16 that counter act the vortex pair Ω2 as will be further described below.

Within the framework of the described exemplary embodiment the ratio AR of a cross sectional area A2 of the diffuser section 11 that intersects a leading point 24 of the outlet 9 in the hot-gas sided surface 5 to the cross sectional area A1 of the metering section 10 is AR=A2/A1=3,9. The leading point 24 of the outlet 9 lies opposite the central edge 14 and in the same plane the central longitudinal axis 18 of the metering section 10 and the central edge 14 are lying in. The diffuser sections 11 cross sectional area ratio AR significantly affects the tendency of a flow to separate. While a large ratio AR is beneficial for a strong deceleration of the flow it also leads to flow separation.

During operation when cooling fluid 4 flows through the inventive film cooling holes 7 from the cold 3 to the hot-gas sided surface 5 of a wall 1 of for example a turbine blade or vane, a vortex will be generated within each of the arms 15, 16 of the diffuser section 11. Both vortices form a vortex pair 25 wherein the direction of rotation of the formed vortex pair 25 is opposite to the counter rotating vortex pair Ω2 induced by the pressure gradient within the streak of cooling fluid 4 (compare FIG. 6 in which the vortices generated in the diffuser section 11 are schematically indicated and FIG. 10 showing the counter rotating vortex pair Ω2). Due to this opposite direction of rotation the newly formed vortex pair is called anti-counter rotating vortex pair 25. The new design of film cooling hole 7 furthermore makes use of a delta vortex generator in order to increase both, the strength as well as the spatial extension of the anti-counter rotating vortex pair 25 and further increase the film cooling effectiveness. As shown in FIG. 6, while the anti-counter rotating vortex pair 25 is been generated within the two arms 15, 16 of the diffuser section 11, the delta vortex 26 is generated at the V-shaped trailing edge 17 defined by the inner walls 23 of the diffuser arms 15, 16 intersecting the hot-gas sided surface 5 of the wall 1 and functioning as a delta vortex generator (the V-shaped trailing edge 17 is indicated by a dashed line in FIG. 3).

Figure 7:
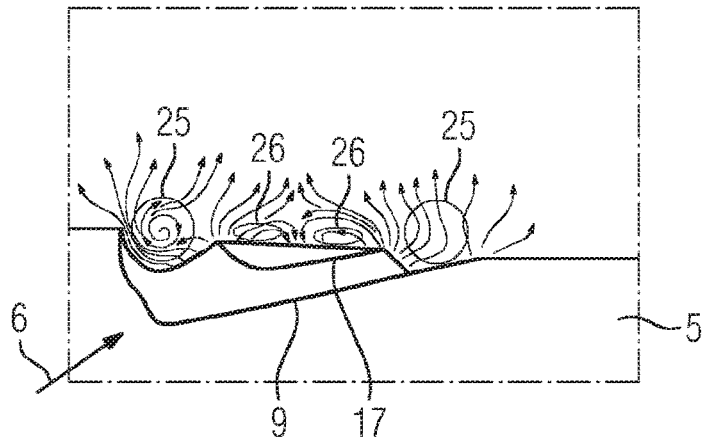
Figure 8:
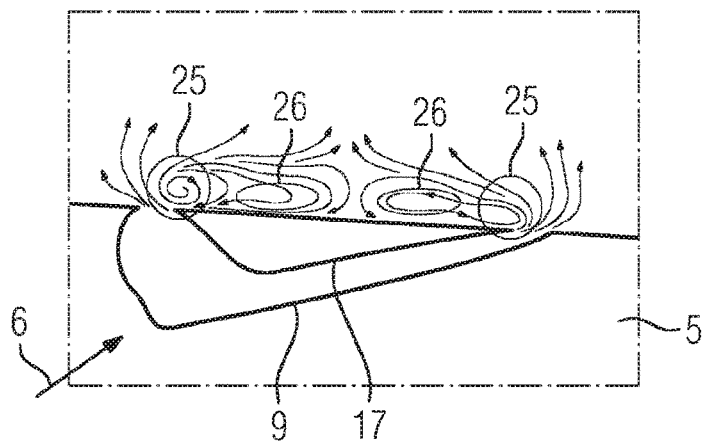
Figure 9:
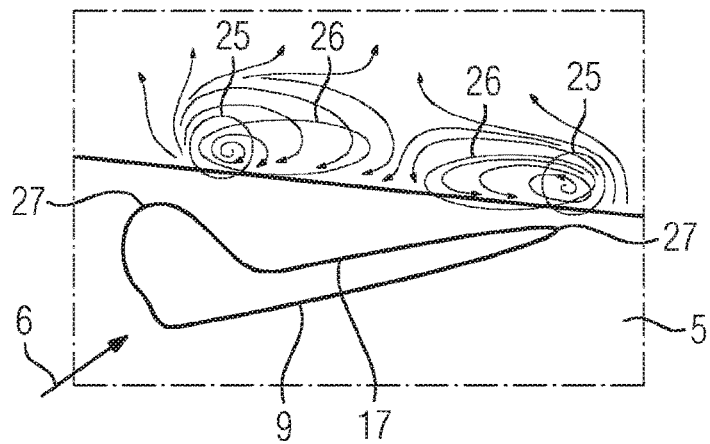

As shown in FIGS. 7 to 9, the generated delta vortex 26 effects the film cooling fluid 4 at the hot-gas sided surface 5 in particular in the region between the two diffuser arms 15, 16. The direction of rotation of the delta vortex 26 is the same like that of the anti-counter rotating vortex pair 25 and correspondingly opposite to the counter rotating vortex pair Ω2 (again, compare FIGS. 6 and 10). This reduces the mixing of the cooling fluid 4 with the main flow of hot gas 6 and thus increases the film cooling effectiveness especially in this region. At the most downstream edge 27 of the diffuser arms 15, 16 the legs of the delta vortex 26 start to merge with the adjacent legs of the anti-counter rotating vortex pair 25 to form a larger anti-counter rotating vortex pair (compare FIG. 9). This is beneficial because the cooling fluid 4 is better distributed on the hot-gas sided surface 5, especially in lateral direction, and the decay of film cooling effectiveness is reduced. Downstream of the film cooling hole 7 an elliptical anti-counter rotating vortex pair is generated which covers the entire lateral width of the cooling fluid streak. Again, the decay of the film cooling effectiveness is reduced since the counter rotating vortex pair Ω2 is weakened by the anti-counter rotating vortex pair 25.

Figure 11:
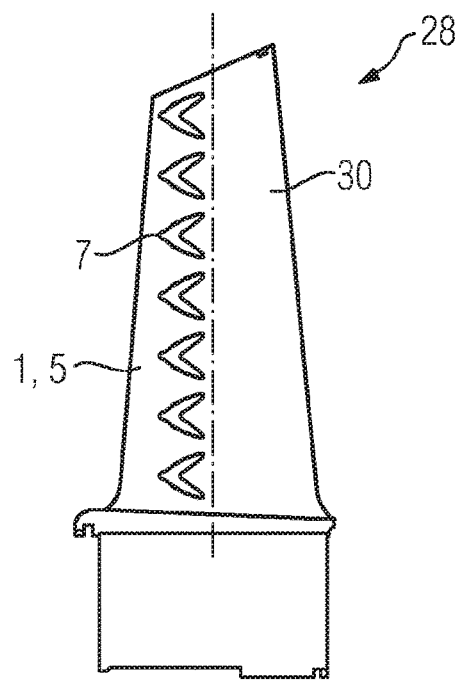
FIGS. 11 to 13 show in a side view a turbine blade a turbine vane and a ring segment each representing a wall comprising one or more rows of inventive film cooling holes.
Figure 12:
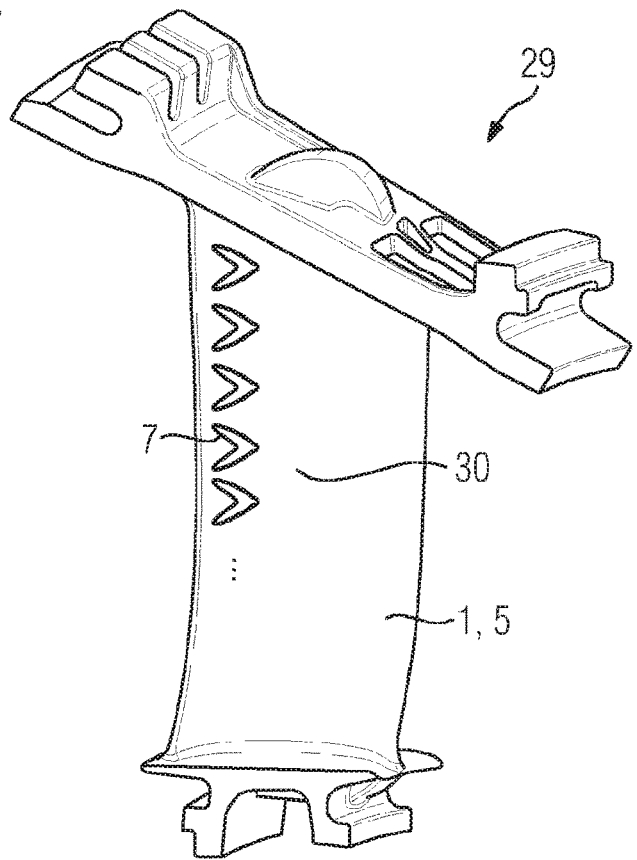
Figure 13:
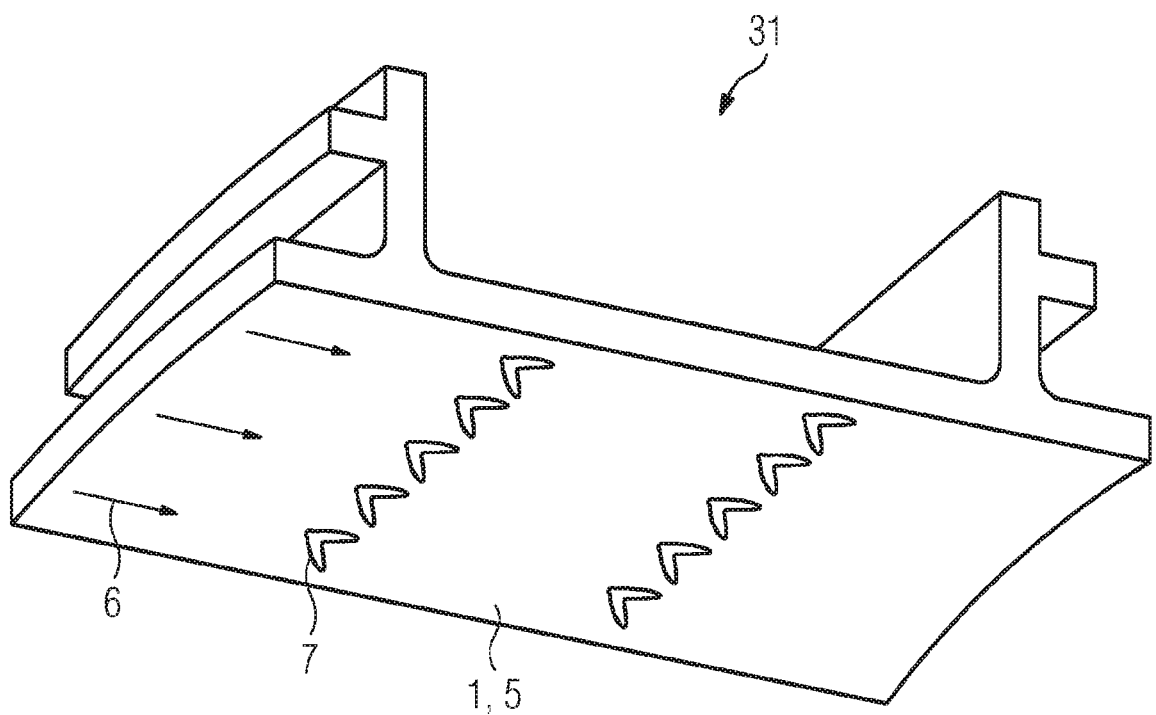

FIGS. 11 to 13 show examples of components that can comprise one or more walls comprising at least one film cooling hole according to the present invention.

FIGS. 11 and 12 shows in a side view a turbine blade 28 and a turbine vane 29 of a gas turbine (not shown in the figures). Each turbine blade 28 and turbine van 29 could comprise fastening elements for attaching said part to a carrier, either a rotor disk or a turbine vane carrier. They further comprise a platform and an aerodynamically shaped airfoil 30 which comprises one or more rows of film cooling holes 7 from which only one row is displayed. Each of the film cooling holes 7 can be adapted according the exemplary embodiment of a film cooling hole described in detail above.

FIG. 13 shows in a perspective view a ring segment 31 comprising two rows of inventive film cooling holes 7 and the displayed ring segment can also be used as a combustor shell element.

Although the present invention has been described in detail with reference to the embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also, elements described in association with different embodiments may be combined. Furthermore, it should be noted, that reference signs in the claims should not be construed as limiting the scope of the claims.

The invention claimed is:

1. A wall of a hot gas component, comprising:
a hot-gas sided surface,
a cold-gas sided surface located opposite the hot-gas sided surface,
at least one film cooling hole extending from an inlet in the cold-gas sided surface to an outlet in the hot-gas sided surface for leading a cooling fluid from the cold-gas sided surface to the hot-gas sided surface,
wherein the respective film cooling hole comprises a metering section extending downstream from the inlet and a diffuser section extending from the metering section to the outlet,
wherein the diffuser section comprises two curved cross-sectional shaped diffuser arms for dividing a fluid flow into two subflows, each of the diffuser arms comprising an inner side wall and an outer side wall, wherein the diffuser section is at least bordered by a diffuser bottom and two opposing outer side walls, wherein the diffuser section comprises a leading region that extends from the metering section to the outlet in the hot-gas sided surface and lies opposite the diffuser bottom and has a constant cross-section over an entire length of the leading region, wherein the leading region of the diffuser section corresponds to an elongation of a leading region of the metering section up to the outlet, the leading region of the diffuser section has the form of a cylinder segment, wherein the diffuser bottom is arched such that a linear and blunt central edge that extends from the metering section to the outlet in the hot-gas sided surface and the two diffuser arms on both sides of the central edge that branch off from the metering section in a V-shaped manner are obtained for generating delta-vortices, wherein the outlet in the hot-gas sided surface is V-shaped, the outlet in the hot-gas sided surface having a trailing edge that is V-shaped, such that the two diffuser arms include an angle ($\beta$) in the range of 50° to 80°, in a plane that is orthogonal to a central longitudinal axis of the metering section, and the V-shaped trailing edge defines an angle ($\alpha$) in the range of 100° to 60°;

wherein the inner side walls are part of the diffuser bottom and the outer side walls connect the diffuser bottom with the leading region, wherein each of the outer side walls in the outlet is curved from a center of the metering section to a tip of the respective diffuser arm in a longitudinal direction of the respective diffuser arm, wherein each of the inner side walls in the outlet is curved from an upstream end of the trailing edge to the tip of the respective diffuser arm, and wherein the inner side walls are flatter than the outer side walls.

2. The wall according to claim 1, wherein the angle ($\beta$) is in the range 56° to 76° and/or the angle ($\alpha$) is 100° to 70°.

3. The wall according to claim 2, wherein the angle ($\alpha$) is 95° to 80°.

4. The wall according to claim 1, wherein the length of the diffuser arms exceeds the length of the central edge and/or the diffuser arms are inclined relative to the metering section.

5. The wall according to claim 1, wherein each diffuser arm is of curved cross-sectional shape.

6. The wall according to claim 1, wherein the metering section has a circular cross-section.

7. The wall according to claim 1, wherein the leading region of the diffuser section has the form of a half-cylinder.

8. The wall according to claim 1, wherein the metering section and the leading region of the diffuser section have the same radius.

9. The wall according to claim 1, wherein the outer side walls are convex.

10. The wall according to claim 1, wherein a ratio (AR) of a cross-sectional area (A2) of the diffuser section that intersects a leading point of the outlet in the hot-gas sided surface to a cross-sectional area (A1) of the metering section is in the range of 2 to 6.

11. The wall according to claim 10, wherein the central longitudinal axis of the metering section lies in one plane with the central edge.

12. The wall according to claim 11, wherein the leading point of the outlet lies opposite the central edge and in the same plane the central longitudinal axis of the metering section and the central edge are lying in.

13. The wall according to claim 10, wherein the ratio (AR) of the cross-sectional area (A2) of the diffuser section that intersects the leading point of the outlet in the hot-gas sided surface to the cross-sectional area (A1) of the metering section is in the range of 3.5 to 4.0.

14. A hot gas component, for a gas turbine, comprising: a wall according to claim 1; wherein the wall comprises a plurality of said at least one film cooling hole.

15. The wall according to claim 1, wherein the metering section of the respective film cooling hole is of constant cross-section.

16. The wall according to claim 1, wherein the outlet in the hot-gas sided surface is boomerang-shaped having two arms, and wherein each arm of the boomerang-shaped outlet is defined by one of the two curved cross-sectional shaped diffuser arms.

17. The wall according to claim 1, wherein the outer side walls have a larger radius than the leading region of the diffuser section.

\* \* \* \* \*